US012311657B2

(12) United States Patent
Penafiel Miguel et al.

(10) Patent No.: US 12,311,657 B2
(45) Date of Patent: May 27, 2025

(54) PRINT APPARATUS

(71) Applicant: Hewlett-Packard Development Company, L.P., Spring, TX (US)

(72) Inventors: Ignacio Penafiel Miguel, Sant Cugat del Valles (ES); Ern Wei Cho, Singapore (SG); Isidoro Maya Agudo, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 154 days.

(21) Appl. No.: 18/005,534

(22) PCT Filed: Jul. 16, 2020

(86) PCT No.: PCT/US2020/042353

§ 371 (c)(1),
(2) Date: Jan. 13, 2023

(87) PCT Pub. No.: WO2022/015314

PCT Pub. Date: Jan. 20, 2022

(65) Prior Publication Data

US 2023/0331007 A1 Oct. 19, 2023

(51) Int. Cl.

*B41J 11/20* (2006.01)
*B41J 11/14* (2006.01)
*B41J 29/38* (2006.01)

(52) U.S. Cl.

CPC ................ *B41J 11/20* (2013.01); *B41J 11/14* (2013.01); *B41J 29/38* (2013.01)

(58) Field of Classification Search

CPC ........ B41J 11/20; B41J 11/007; B41J 13/103; B41J 11/04; B41J 29/38; B41J 11/02; B41J 11/14

See application file for complete search history.

(56) References Cited

U.S. PATENT DOCUMENTS

| | | | |
|---|---|---|---|
| 4,184,780 A | 1/1980 | Kurihara | |
| 5,489,160 A | 2/1996 | Patrick et al. | |
| 6,171,001 B1 | 1/2001 | Nonaka | |
| 6,736,557 B2 | 5/2004 | Devore et al. | |
| 9,586,424 B2 | 3/2017 | Campbell et al. | |
| 2001/0016137 A1* | 8/2001 | Omura | B41J 11/005 400/58 |

FOREIGN PATENT DOCUMENTS

| | | |
|---|---|---|
| DE | 69511370 T2 | 11/1999 |
| JP | 10-016339 A | 1/1998 |
| JP | 2932034 B2 | 8/1999 |
| JP | 2000-229456 A | 8/2000 |
| JP | 2002-144647 A | 5/2002 |

* cited by examiner

*Primary Examiner* — Jannelle M Lebron
(74) *Attorney, Agent, or Firm* — Jordan IP Law, LLC

(57) ABSTRACT

Disclosed is a print apparatus (1) comprising a platen (2), a support (3) to receive a driver (11), and an adjustment mechanism (4), coupled or couplable to the platen (2), to cause movement of the platen (2) relative to the support (3) in use. The adjustment mechanism (4) comprises an interface (5) connectable to the driver (11) to receive input motion from the driver (11) to thereby cause the movement of the platen (2) relative to the support (3).

13 Claims, 4 Drawing Sheets

PRINT APPARATUS

BACKGROUND

The present disclosure relates to a print apparatus, a method, a non-transitory computer readable medium, and a kit.

In printing applications, in order to ensure the print quality is maintained, the print zone should remain substantially flat. However, manufacturing tolerances in components may result in undesirable variations in the flatness of the print zone.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
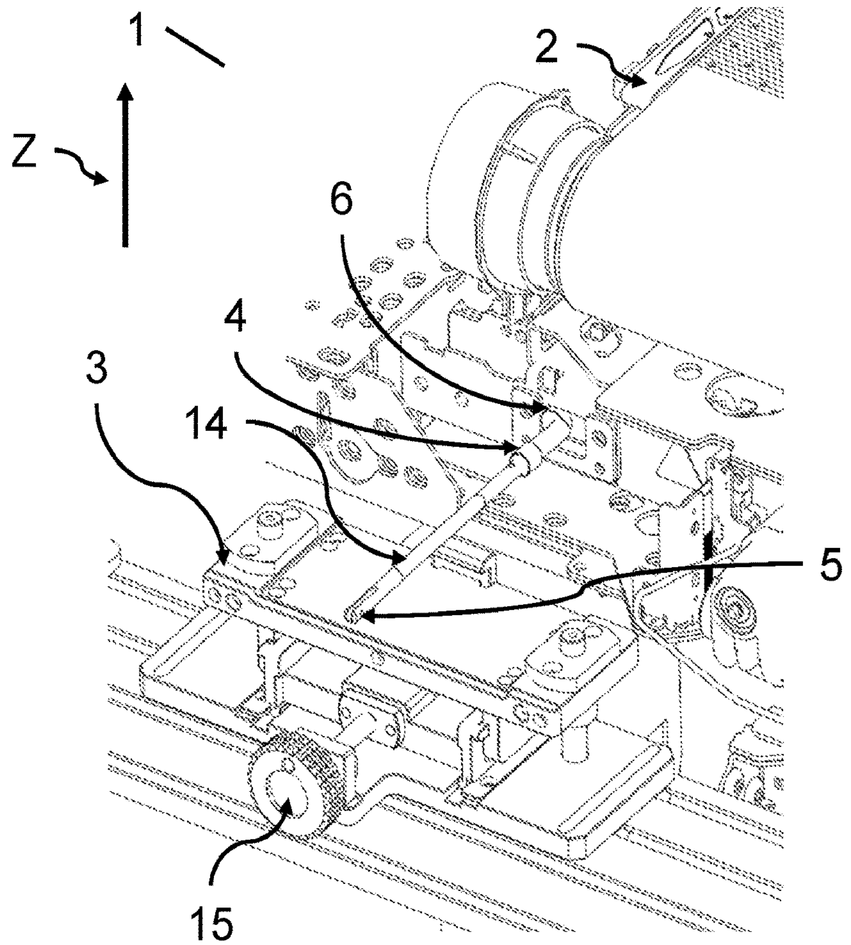
FIG. 1 shows a schematic view of a print apparatus of one example.

FIG. 1 shows a print apparatus 1 according to one example. The print apparatus 1 comprises a platen 2, a support 3 to receive a driver (not shown) and an adjustment mechanism 4. The adjustment mechanism 4 is coupled or couplable to the platen 2 and is to cause movement of the platen 2 relative to the support 3 in use. The adjustment mechanism 4 comprises an interface 5 which is connectable to the driver to receive input motion from the driver to thereby cause the movement of the platen 2 relative to the support 3.

As shown in FIG. 1, the adjustment mechanism 4 comprises a platen cam element 6. The platen cam element 6 is to cause the movement of the platen 2 relative to the support 3. In this example, the platen cam element 6 is to cause the platen 2 to move relative to the support 3 in a direction perpendicular to a surface defining a print zone (as indicated by arrow Z in FIG. 1). The print zone is the area in which printing occurs in use. In the example shown in FIG. 1, the platen cam element 6 is a rotatable cam. The rotatable platen cam element 6 is an eccentric mechanism and a part of the platen 2 acts as a cam follower to follow movement of the rotatable platen cam element 6 such that rotation of the platen cam element 6 causes the platen to move relative to the support 3. The rotatable cam element 6 is to cause the platen 2 to move by an amount relative to the rotation of the rotatable cam element 6. In the example shown in FIG. 1, the rotatable cam element 6 is rotatable over 360 degrees. In other examples, the rotatable cam element 6 is rotatable over more or less than 360 degrees. In the example of FIG. 1, the rotatable cam element 6 is profiled such that rotation of the rotatable cam element 6 causes the platen 2 to move by at least 6 millimeters in the direction indicated by arrow Z in FIG. 1. In other examples, the rotation of the rotatable cam element 6 causes the platen 2 to move by more than 6 millimeters, less than 6 millimeters or exactly 6 millimeters.

In some examples, such as this example, the adjustment mechanism 4 is to convert the input motion into movement of the platen cam element to cause movement of the platen 2 relative to the support 3. In particular, in the example of FIG. 1, the adjustment mechanism 4 is to convert input motion into rotation of the rotatable platen cam element 6 to cause movement of the platen 2 relative to the support 3. In the example shown in FIG. 1, the adjustment mechanism 4 includes a rod 14 which is couplable to the driver (not shown). Rotation of the rod 14 causes rotary motion of the platen cam element 6.

Figure 2:
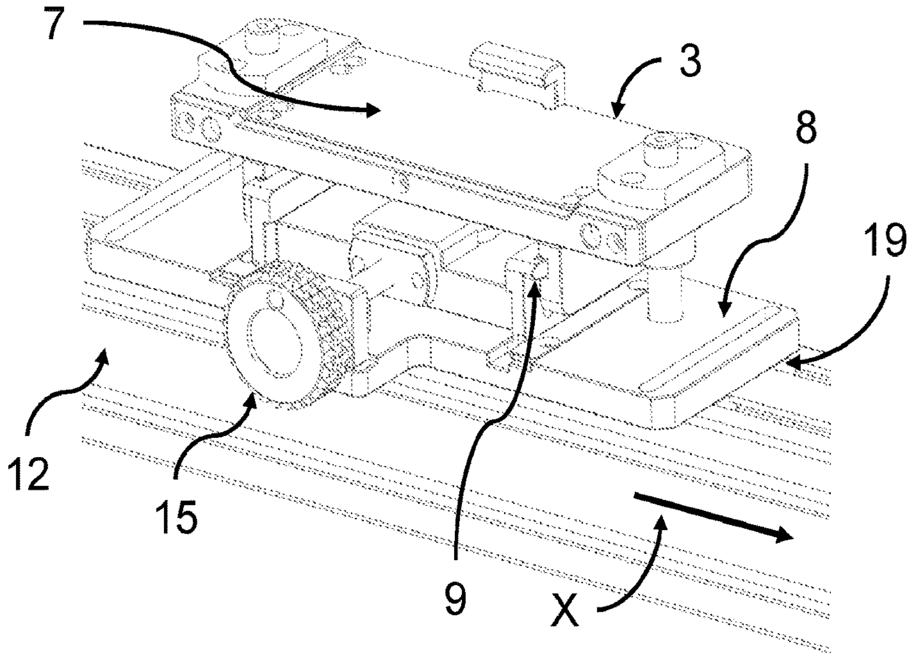
FIG. 2 shows a schematic view of the support of FIG. 1.
Figure 3:
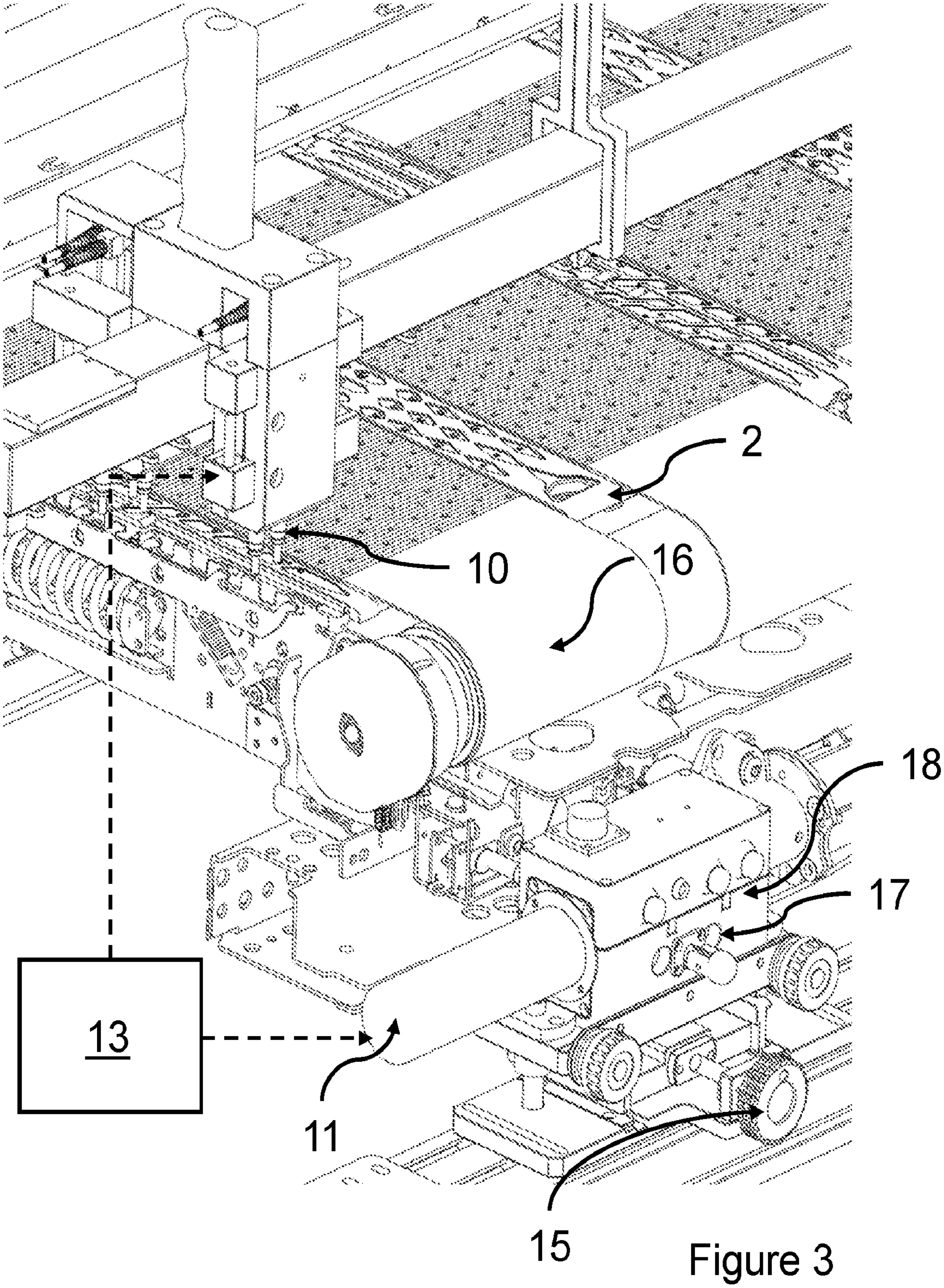
FIG. 3 shows a schematic view of the print apparatus of FIG. 1.

FIG. 2 shows the support 3 as shown in FIG. 1. The support 3 comprises a first part 7 and a second part 8. The first part 7 is to receive the driver (not shown). The second part 8 is fixed relative to a beam 12. The first part 7 is moveable relative to the second part 8 to adjust a position of the driver relative to the platen 2. As shown in the example of FIG. 2, the support 3 comprises a support cam element 9 to cause movement of the first part 7 relative to the second part 8. Alternatively, a mechanism other than the support cam element 9 may be used to cause movement of the first part 7 of the support 3 relative to the second part 8 of the support 3. For example, an actuator (such as a linear actuator), lead screw or other suitable device can be used to cause movement of the first part 7 relative to the second part 8. Moreover, the support 3 is moveable in a direction parallel to the beam 12 (as shown by arrow X). The support 3 comprises channels in which a guide element 19 of the support 3 is received. In the example of FIG. 3, the guide element 3 is a nut. A cross-section of the nut has a substantially "T" shape. In other examples, different guide elements with different cross-sections are used. In this example, the guide element 3 is tightened against the beam 12 to substantially prevent movement of the support 3 in the direction parallel to the beam 12 (as shown by arrow X). The guide element 3 helps to ensure that the support 3 is aligned on the beam 12 and does not lift away from the beam 12 when the support is attached to the beam 12.

In the example shown in FIG. 2, the support cam element 9 is a linear cam. The linear support cam element 9 takes the form of a wedge. When the wedge moves into and out of the support, the wedge forces the first part 7 and the second 8 away from each other. In other examples, the support cam element 9 may take any other suitable form, such as a rotary cam. The support cam element 9 of FIG. 2 is moveable by rotation of a knob 15. The knob 15 is connected to the support cam element 9 by a threaded element. As such, when the knob 15 is rotated, the thread also rotates, causing movement of the support cam element 9 towards and/or away from the knob 15. The knob 15 may be operated manually by an operator of the print apparatus 1. Alternatively or additionally, the knob 15 may be operated automatically without user interaction.

The support 3 shown in FIG. 2 is provided on the beam 12. The beam 12 may be to hold multiple supports 3 in use. The provision of the beam 12 allows the support 3 to be attached remote from the print zone. As such, the support 3 does not interfere with the print zone.

FIG. 3 shows a schematic view of the print apparatus 1 of FIG. 1. The print apparatus 1 comprises a platen position measurement device 10. The platen position measurement device 10 is to determine a position of at least a part of the platen 2 relative to a reference position. In some examples, the platen position measurement device 10 comprises an electrical transformer, for example a Linear Variable Differential Transformer (LVDT) as is the case in this example.

In some examples, the platen position measurement device 10 is to substantially continually determine the position of the at least the part of the platen 2 relative to the reference position over a predetermined period. In some examples, the period is a set period, for example 1 minute, 5 minutes, 60 minutes, 7 days, or the like. Alternatively, the period is a period over which another action is occurring. For example, the period may be the period over which the driver 11 is operated.

In some examples, the at least the part of the platen 2 is a surface of the platen 2 or component of the platen 2. In some examples, the at least the part of the platen 2 is a surface of the platen 2 which contacts or is in closest proximity to the print media in use. Alternatively, the at least the part of the platen 2 is a belt 16 provided over the platen 2. The belt 16 may be to move the print media through the print apparatus 1 in use.

In some examples, a plurality of platen position measurement devices 10 is provided. Each platen position measurement device 10 may determine the position of a different part of the platen 2 relative to the reference position or relative to respective reference positions. The provision of a plurality of platen position measurement devices 10 may increase the accuracy of measurements and may provide redundancy should one platen position measurement device 10 fail. In some examples, a first platen position measurement device 10 is used to determine how much the platen 2 should be moved and a second platen position measurement device 10 is used to determine how much the platen 2 has been moved by the driver 11. In some examples, the first platen position measurement device 10 outputs information indicative of the position of a part of the platen 2 to the controller 13. Based on this information, the controller 13 provides instructions to the driver 11 to cause movement of the part of the platen 2. The second platen position measurement device 10 outputs information indicative of how much the part of the platen 2 has been moved by the driver 11 to the controller 13. This information can be used, along with further information from the first platen position measurement device 10, to determine if further movement of the part of the platen 2 is needed. In some examples, sets of the first and second platen position measurement devices 10 are provided at both opposite front and rear ends of the platen 2.

FIG. 3 shows the print apparatus 1 and a driver 11 provided on the support 3. The driver 11 of FIG. 3 is a motor which comprises a worm gear to convert rotary motion of an output of the motor into rotary motion of the platen cam element 6. In other examples, the driver causes movement of the platen cam element 6 without the worm gear. Moreover, the driver 11 may be a device other than a motor. For example, in some examples, the driver is an actuator, such as a linear actuator. The driver 11 is removably attachable to the support 3 such that when the platen is moved to the desired position, the driver 11 may be removed (for example, to be used elsewhere on the print apparatus 1).

In use, the support 3 is moved by the support cam element 9 to substantially align relative to a part of the platen 2. For example, the support 3 may be moved to substantially align with the interface 5 of the adjustment mechanism 4. The driver 11 is then positioned on the support 3 such that the driver 11 connects to the adjustment mechanism 4. Based on an output from the platen position measurement device 10, the driver 11 rotates the platen cam element 6 to move the platen 2 relative to the support 3. When the platen has reached a desired location with respect to the support, the adjustment mechanism 4 is locked in place to prevent the platen cam element 6 from moving. For example, in this example once the platen is in the desired location, fixing screw are inserted through holes 17 in fixing block 18 to substantially prevent the platen cam element 6 from moving the platen 2 further. The driver 11 is then removed and can be used to in another part of the print apparatus 1.

As the driver 10 is removable to be used elsewhere in the print apparatus 1, fewer drivers 10 are needed to calibrate the flatness of the platen 2, thereby reducing the operating cost of the print apparatus 1. Moreover, as fewer components are needed, maintenance of the print apparatus 1 is made easier and/or more efficient.

In some examples, two drivers 11 are provided at opposite ends of the platen 2. For example, the opposite ends of the platen 2 are the front of the platen 2 and the rear of the platen 2, whereby the print media travels from the front of the platen 2 to the rear of the platen 2 in use. As such, the platen 2 can be adjusted from both ends at once to ensure that the print zone remains substantially even and/or flat.

In some examples, a kit comprises the driver 11 to be detachably connectable to an interface 5 of an adjustment mechanism 4 of a print apparatus 1 to thereby transmit input motion from the driver 11 to the interface 5 of the adjustment mechanism 4. The kit further comprises the platen position measurement device 10 to output a signal on the basis of the position determined. The kit further comprises a controller 13 to receive the signal and to control the driver 11 on the basis of the signal.

As shown in FIG. 3, the controller 13 is operatively connected to the driver 11 and the platen position measurement device 10 in use. The controller is to receive a signal from the platen position measurement device 10 and to control operation of the driver 11 on the basis of the received signal.

Figure 4:
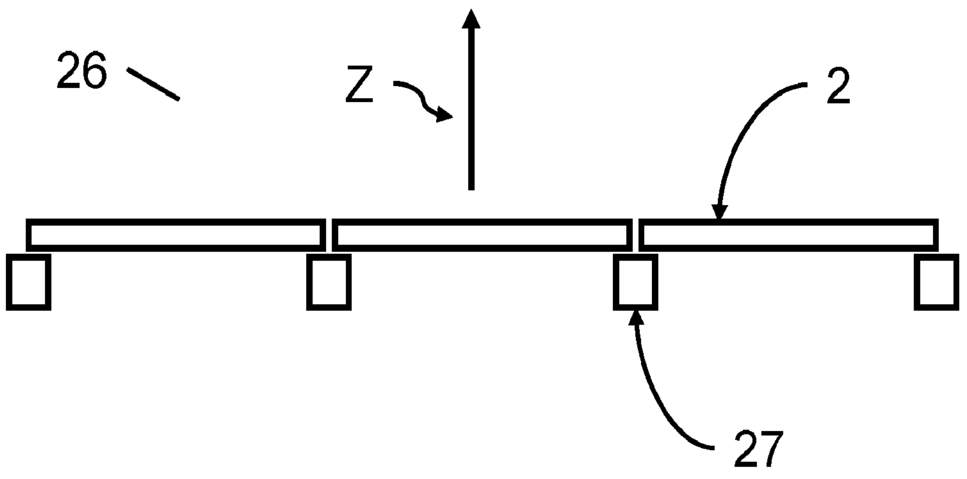
FIG. 4 shows a schematic view of a platen arrangement of one example.

In some examples, as shown in FIG. 4, the print apparatus 1 comprises a platen arrangement 26 comprising a plurality of platens 2 and a plurality of ribs 27 to which the platens 2 are connected. The total number of ribs 27 is equal to the number of platens 2 plus one. In the example of FIG. 4, the platen arrangement 26 comprises three platens 2 and four ribs 27. In other examples, fewer or greater platens 2 or ribs 27 are provided. The ribs 27 are provided parallel to each other and the platens 2 are provided adjacent each other such that a rib is between each adjacent platen 2 and at either longitudinal end of the platen arrangement 26. In this example, the adjustment mechanism 4 is operatively connected to the rib 27 to cause movement of the platen 2 in the direction indicated by arrow Z as also discussed in relation to FIG. 1. To ensure that the print zone remains substantially flat, the positions of the ribs 27 (and therefore the platens 2) are calibrated in sequential order from a first side of the platen arrangement 26 to a second side of the platen arrangement 26 opposite the first side by moving the ribs in the direction shown by arrow Z (as discussed in relation to FIG. 1). In the example shown in FIG. 4, the position of each rib 27 is calibrated in sequential order from the left-hand side of the platen arrangement 26 to the right-hand side of the platen arrangement 26.

Figure 5:
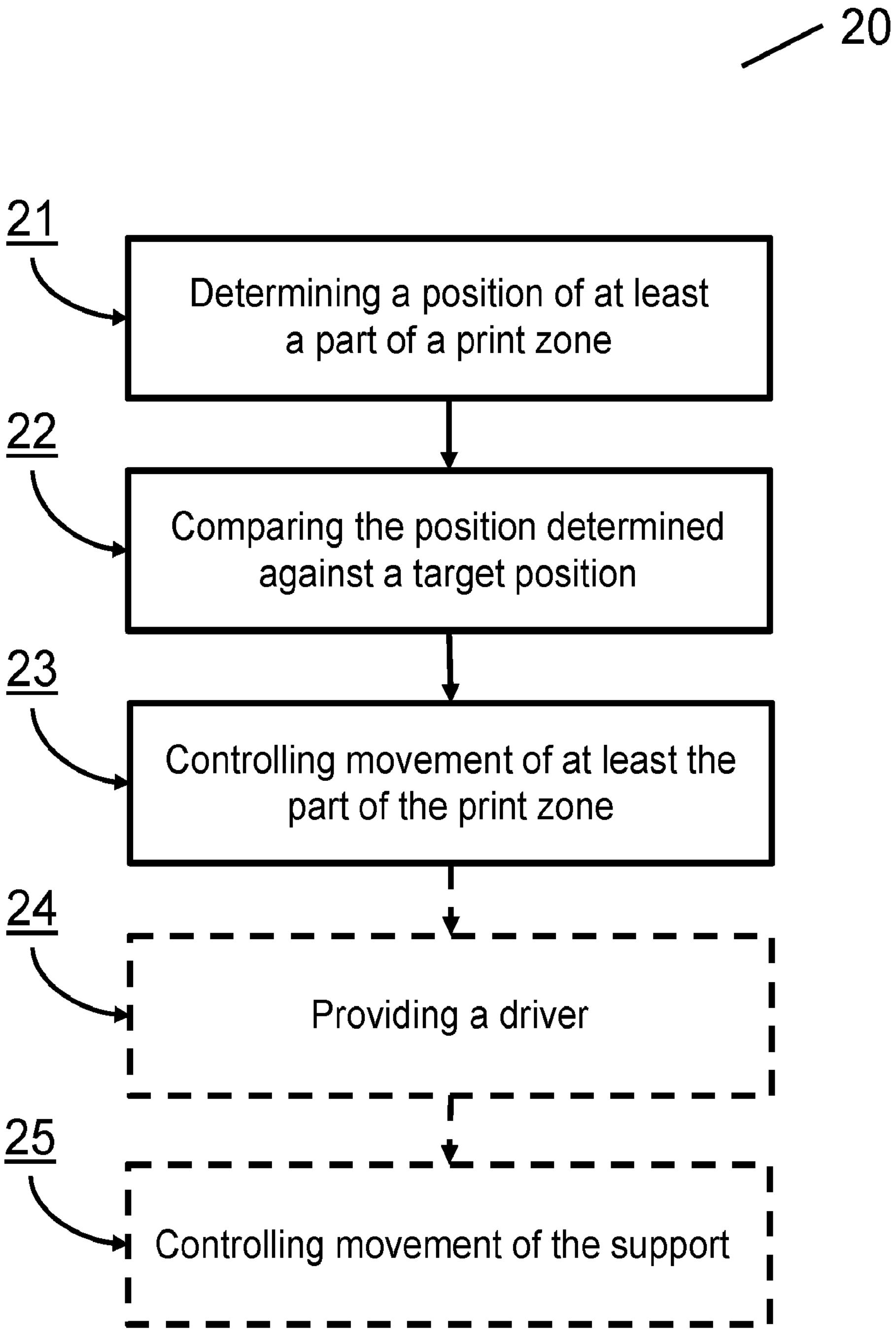
FIG. 5 shows a flow chart of a method of one example.

FIG. 5 shows a flow chart of a method 20 according to one example. The method 20 comprises determining 21 a position of at least a part of a print zone of a printer relative to a reference feature. In some examples, the reference feature is a print head of the printer. Alternatively, the reference feature is another part of the printer. In some examples the at least the part of the print zone comprises the platen 2. The method 20 also comprises comparing 22 the position determined against a target position relative to the reference feature and controlling 23 movement of at least the part of the print zone relative to the reference features to reduce a difference between the position determined and the target position. By reducing the difference between the position determined and the target position, the method 20 helps to ensure that the print zone is substantially flat. As discussed above, maintaining the flatness of the print zone helps to increase and/or maintain print quality of the printer.

In the example of FIG. 5, the determining 21 the position of the at least the part of the print zone comprises substantially continually determining the position of the at least the part of the print zone for a predetermined period. Examples of such periods are discussed above. By substantially continually determining 21 the position of the print zone, a more accurate determination of the position and movement of the print zone can be achieved. Alternatively, in some example, the determining 21 the position of the at least the part of the print zone comprises determining the position at discrete points in time. For example, every millisecond, every second or every minute.

In the example of FIG. 5, the controlling movement 23 comprises operating a driver 11 to drive movement of the at least the part of the print zone relative to the reference feature. The driver 11 may be that described in relation to FIG. 3 above. As shown in FIG. 5, in some examples, the method 20 comprises providing 24 the driver 11 on a support 3 remote from the print zone.

As shown in FIG. 5, in some examples, the method 20 comprises controlling 25 movement of the support 3 relative to a portion of the print zone. For example, the support 3 may be mover relative to a portion of the print zone to align the driver 11 relative to a part of the print zone.

The method 20 may be performed without the need for human interaction. As such, the method 20 may be carried out automatically by a controller (such as the controller 31 described above) thereby removing and/or reducing user error.

In some examples, the method 20 is carried out after the printer and/or print apparatus 1 is constructed. This allows the print zone to be calibrated in its completed form, reducing the chance of errors being introduced by the addition of further elements of the printer and/or print apparatus 1.

Figure 6:
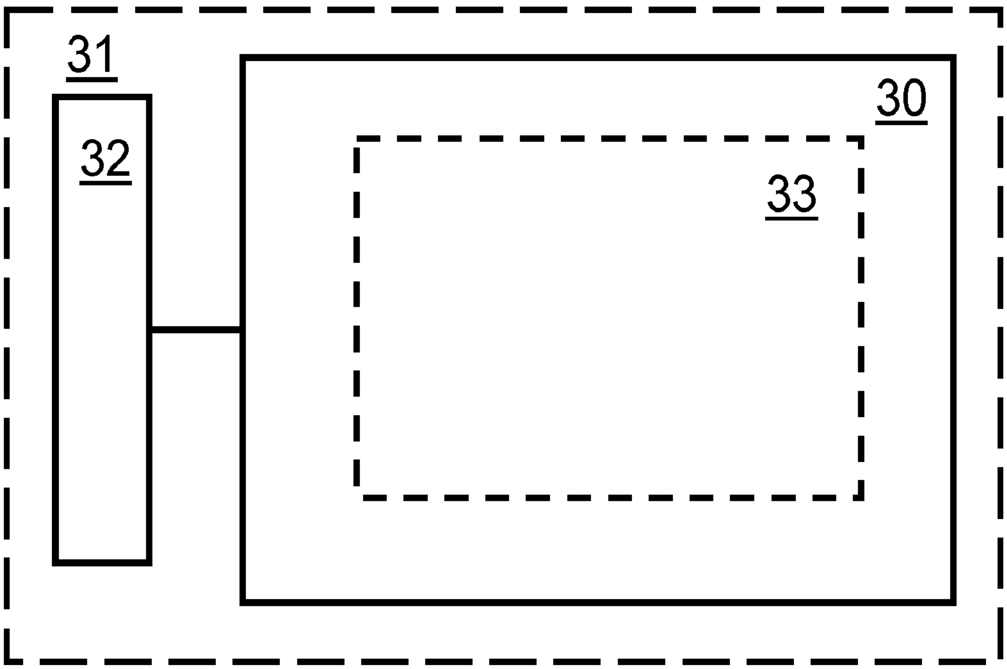
FIG. 6 shows a schematic view of a non-transitory computer readable medium of one example.

FIG. 6 shows a schematic diagram of a non-transitory computer-readable storage medium 30 according to one example. The non-transitory computer-readable storage medium 30 stores instructions 33 that, if executed by a processor 32 of a controller, such as controller 31, cause the processor 32 to perform one of the methods described herein. In one example, the instructions 33 comprise instructions to perform any of the methods 20 described above with reference to FIG. 5. In other examples, the instructions 33 comprise instructions to perform any of the other methods 20 described herein. In one example, the controller 31 is any controller described herein.

In some examples, the print apparatus 1 described herein may be provided as part of a printer or may be a printer.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A print apparatus comprising:

a platen;

a support to receive a driver; and an adjustment mechanism, coupled or couplable to the platen, to cause movement of the platen relative to the support in use, wherein the adjustment mechanism comprises an interface connectable to the driver to receive input motion from the driver to thereby cause the movement of the platen relative to the support, and wherein the support comprises a first part and a second part, wherein the first part is to receive the driver, and wherein the first part is moveable relative to the second part to adjust a position of the driver relative to the platen.

2. The print apparatus according to claim 1, wherein the adjustment mechanism comprises a platen cam element to cause the movement of the platen relative to the support.

3. The print apparatus according to claim 2, wherein the platen cam element is a rotatable cam.

4. The print apparatus according to claim 2, wherein the adjustment mechanism is to convert the input motion into movement of the platen cam element to cause the movement of the platen relative to the support.

5. The print apparatus according to claim 1, wherein the support comprises a support cam element to cause movement of the first part relative to the second part.

6. The print apparatus according to claim 1, comprising a platen position measurement device to determine a position of at least a part of the platen relative to a reference position.

7. The print apparatus according to claim 6, wherein the platen position measurement device is to substantially continually determine the position of the at least the part of the platen relative to the reference position over a predetermined period.

8. A method comprising:

determining a position of at least a part of a print zone of a printer relative to a reference feature;

comparing the position determined against a target position relative to the reference feature; and controlling movement of at least the part of the print zone relative to the reference feature to reduce a difference between the position determined and the target position, wherein the determining the position of the at least the part of the print zone comprises substantially continually determining the position of the at least the part of the print zone for a predetermined period.

9. The method according to claim 8, wherein the controlling movement comprises operating a driver to drive movement of the at least the part of the print zone relative to the reference feature.

10. The method according to claim 9, comprising providing the driver on a support remote from the print zone.

11. The method according to claim 10, comprising controlling movement of the support relative to the print zone to align the driver relative to a portion of the print zone.

12. A non-transitory computer readable medium comprising a set of computer-readable instructions stored thereon, which, when executed by a processor, cause the processor to carry out the method of claim 8.

13. A kit comprising:

a driver to be detachably connectable to an interface of an adjustment mechanism of a print apparatus to thereby transmit input motion from the driver to the interface of the adjustment mechanism;

a platen position measurement device to determine a position of at least a part of a platen of the print apparatus relative to a reference position, and to output a signal on the basis of the position determined; and a controller to receive the signal and to control the driver on the basis of the signal.

* * * * *